United States Patent                                      [11] 3,615,417

[72] Inventors  Guy Alfred Rillaers
                Kontich;
                Henri Depoorter, Mortsel, both of Belgium
[21] Appl. No.  834,169
[22] Filed      June 17, 1969
[45] Patented   Oct. 26, 1971
[73] Assignee   Gevaert-Agfa N.V.
                Mortsel, Belgium
[32] Priority   July 5, 1968
[33]            Great Britain
[31]            32,351/68

[54] SPECTRAL SENSITIZATION OF LIGHT-SENSITIVE ELEMENTS USING CYANINE DYES
     8 Claims, No Drawings

[52] U.S. Cl. ................................................... 96/1.6,
                       96/1.5, 96/1.7, 96/130, 96/136, 260/240.4
[51] Int. Cl. ................................................... G03g 5/00
[50] Field of Search ........................................... 96/102,
                                                      106, 1.5, 1.6, 1.7

[56]                References Cited
                UNITED STATES PATENTS
     2,482,532  9/1949  Anish ........................... 260/240.4
     3,440,052  4/1969  Hessettine ..................... 96/105

Primary Examiner—George F. Lesmes
Assistant Examiner—M. B. Wittenberg
Attorney—Alfred W. Breiner ABSTRACT: A silver halide or inorganic photoconductor is spectrally sensitized with a cyanine dye comprising two heterocyclic nitrogen-containing ring systems linked by a conjugated methine group.

SPECTRAL SENSITIZATION OF LIGHT-SENSITIVE ELEMENTS USING CYANINE DYES

The present invention relates to new methine dyes, to the preparation thereof, to their use as optical sensitizing agents for the sensitization of light-sensitive elements, more particularly light-sensitive silver halide and photoconductive compounds, and to light-sensitive elements sensitized therewith.

Numerous methine dyes and their use as spectral sensitizers in photographic light-sensitive silver halide elements have been described. However, among these sensitizers only a few are suitable for extending the sensitivity of photographic silver halide emulsions to the extreme red region beyond 700 nm of the spectrum. Moreover, the sensitizing action of the known "far-red"-sensitizers and their poor stability (keeping power) often make them unsuitable for practical use.

Spectral sensitization of photoconductive inorganic substances such as zinc oxide can also be performed with methine dyes as described e.g. in U.S. Pat. Specification No. 3,128,179. The dyes proposed for the spectral sensitization of photoconductive inorganic compounds have a sensitizing action only for a well-defined part of the visible spectrum. Moreover, these spectral sensitizers having their main absorption in the visible region of the spectrum, strongly dye the photoconductive layer when used in the required amount and therefore necessitate, as described in United Kingdom Pat. Specification No. 1,020,755 the use of additional dyes compensating the undesirable coloring of the photoconductive layer. In practice, a mixture of at least two—most often more than two—dyes must be used for obtaining a high sensitivity when exposing a photoconductive layer to an illuminating source such as an ordinary light bulb and/or for obtaining a neutral tint of the photoconductive layer.

Therefore, it is an object of the present invention to provide a class of new stable spectral sensitizing agents for inorganic photoconductive substances such as photoconductive zinc oxide and for light-sensitive silver halide, which have favorable spectral sensitizing effects and do not have the mentioned disadvantages.

In accordance with the present invention new cyanine dyes are provided which are characterized in that the conjugated methine chain linking the two nitrogen containing heterocyclic nuclei contains a 1-oxy-3,4-dioxo-cyclopentene-1 ring.

Particularly suitable sensitizing dyes according to the present invention are the dyes corresponding to the following general formulae:

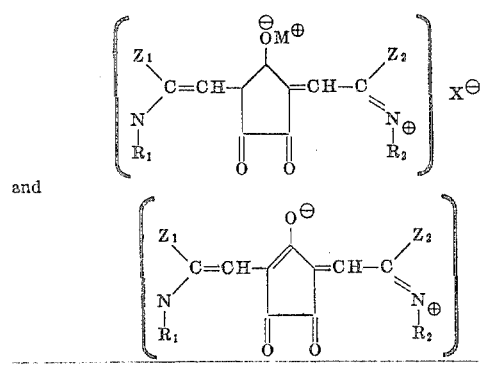

wherein: each of $R_1$ and $R_2$ (the same or different) stands for a substituent of the type contained in cyanine dyes on the cyanine nitrogen atom, e.g. an alkyl group such as methyl, ethyl, propyl, isopropyl, butyl, isobutyl, a substituted alkyl group such as β-hydroxyethyl, β-acetoxy-ethyl, carboxymethyl and carboxyethyl as described in the German Pat. Specification No. 704,141, sulphoalkyl as described in the United Kingdom Pat. Specification No. 742,112 such as sulphoethyl, sulphopropyl, sulphobutyl, sulphatoalkyl as described in the French Pat. Specification No. 1,149,769 such as sulphatopropyl and sulphatobutyl, the group -A-W-NH-V-B wherein A, W, V and B have the same significance as set forth in United Kingdom Pat. Specification No. 904,332 such as a N-(methylsulphonyl)-carbamyl-methyl group, γ-(acetylsulphanyl)-propyl, a δ-(acetylsulphamyl)-butyl group, an allyl group, an aralkyl group e.g. a benzyl group, a substituted aralkyl group such as carboxybenzyl and sulphobenzyl, an aryl group such as phenyl, a substituted aryl group such as carboxyphenyl, or a cycloalkyl group such as cyclohexyl, each of $Z_1$ and $Z_2$ (the same or different) represents the nonmetallic atoms necessary to complete a heterocyclic nucleus containing five or six atoms in the heterocyclic ring e.g. a nucleus of the thiazole series (e.g. thiazole, 4-methyl-thiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series e.g. benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-dioxymethylenebenzothiazole, 5-hydroxybenzothiazole, 6-hydroxybenzothiazole, 4,5,6,7-tetrahydrobenzothiazole, those of the naphthothiazole series (e.g. naphtho[2,1-d]thiazole, naphtho[1,2-d]thiazole, 5-methoxynaphtho[1,2-d]thiazole,5-ethoxynaptho[1,2-d]thiazole, 8-methoxynaphtho[2,1-d]thiazole,7-methoxynaphtho[2,1-d]thiazole), those of the thionaphtheno[7,6-d]thiazole series (e.g. 7-methoxy-thionaphtheno[7,6-d]thiazole), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxy-benzoxazole, 6-hydroxybenzoxazole), those of the naphthoxazole series (e.g. naphtho[2,1-d]oxazole, naphtho[1,2-d]oxazole), those of the selenazole series (e.g. 4-methyl-selenazole, 4-phenyl-selenazole), those of the benzoselenazole series (e.g. benzoselenazole, 5-chlorobenzoselenazole, 5-methyl-benzoselenazole, 5,6-dimethylbenzoselenazole, 5-methoxybenzoselenazole, 5-methyl-6-methoxybenzoselenazole, 5,6 - dioxymethylenebenzoselenazole, 5-hydroxybenzoselenazole, 4,5,6,7-tetrahydrobenzoselenazole), those of the naphthoselenazole series (e.g. naphtho[2,1-d]selenazole, naphtho[1,2-d]selenazole), those of the thiazoline series (e.g. thiazoline, 4-methylthiazoline, 4-hydroxymethyl-4-methylthiazoline, 4,4-bis-hydroxymethylthiazoline), those of the oxazoline series e.g. oxazoline), those of the selenazoline series (e.g. selenazoline), those of the 2-quinoline series (e.g. quinoline, 6-methylquinoline, 6-chloroquinoline, 6-methoxyquinoline, 6-ethoxyquinoline, 6-hydroxyquinoline), those of the 4-quinoline series (e.g. quinoline, 6-methoxy-quinoline, 7-methylquinoline 8-methylquinoline), those of the 1-isoquinoline series (e.g. isoquinoline, 3,4-dihydro-isoquinoline), those of the 3-isoquinoline series (e.g. isoquinoline), those of the 3,3-dialkylindolenine series (e.g. 3,3-dimethylindolenine, (e.g. 3,3-dimethyl-5-chloroindolinine, 3,3,5-trimethylindolenine, 3,3,7-trimethylindolenine), those of the pyridine series (e.g. pyridine, 5-methyl pyridine), or those of the benzimidazole series (e.g. 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-phenylbenzimidazole, 1-ethyl-5-fluorobenzimidazole, 1-ethyl-5-cyanobenzimidazole, 1-(β-acetoxyethyl)-5-cyanobenzimidazole, 1-ethyl-5-chloro-6-cyano benzimidazole, 1-ethyl-5-fluoro-6-cyano benzimidazole, 1-ethyl-5-acetylbenzimidazole, 1-ethyl-5-carboxybenzimidazole, 1-ethyl-5-ethoxy-carbonylbenzimidazole, 1-ethyl-5-sulphamylbenzimidazole, 1-ethyl-5-N-ethylsulphamylbenzimidazole, 1-ethyl-5,6-difluorobenzimidazole, 1-ethyl-5,6-dicyanobenzimidazole, 1-ethyl-5-ethylsulphonylbenzimidazole, 1-ethyl-5-methyl-sulphonylbenzimidazole, 1-ethyl-5-trifluoromethylbenzimidazole, 1-ethyl-5- trifluoromethylsulphonyl-benzimidazole, 1-ethyl-5-trifluoromethylsulphinylbenzimidazole, and $X^1$ represents an anion such as a chloride ion, a bromide ion, an iodide ion, a perchlorate ion, a benzene sulfonate ion, a p-toluenesulphonate ion, a methylsulphate ion, an ethylsulphate ion, a propylsulphate ion, but $X^1$ is not present when $R_1$ and/or $R_2$ itself contains an anionic group, e.g. $-SO_3^{(1)}$, $-OSO_3^{(1)}$, $-COO^{(1)}$, $-SO_2^{(1)}NH-$, $-SO_2^{(1)}-N-CO-$, $-SO_2^{(1)}-N-SO_2-$, and $M^+$ stands for a cation e.g. a hydrogen cation, a metal cation or an onium cation of inorganic or organic nature such as ammonium and pyridinium.

The following is a nonlimitative list of representative examples of cyanine dyes according to the present invention. For the sake of convenience the dyes are represented in the form of their betaine structure although in the preparation of these dyes mixtures of the dyes in betaine form and in salt form are obtained and used as such.

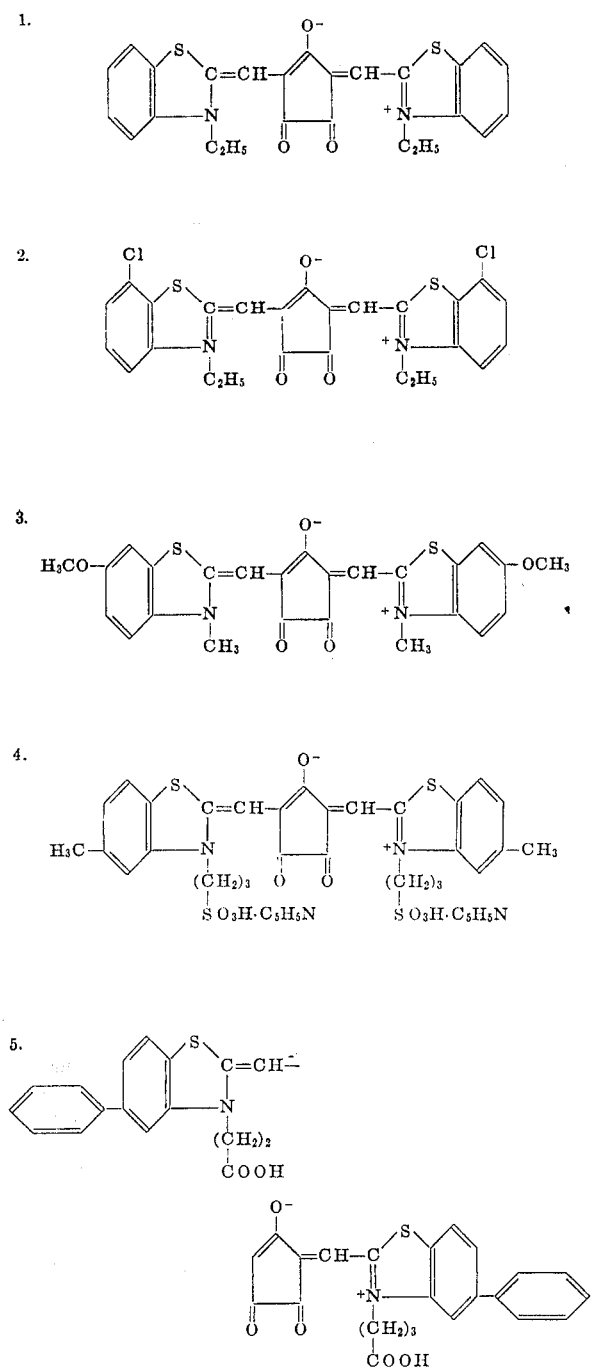

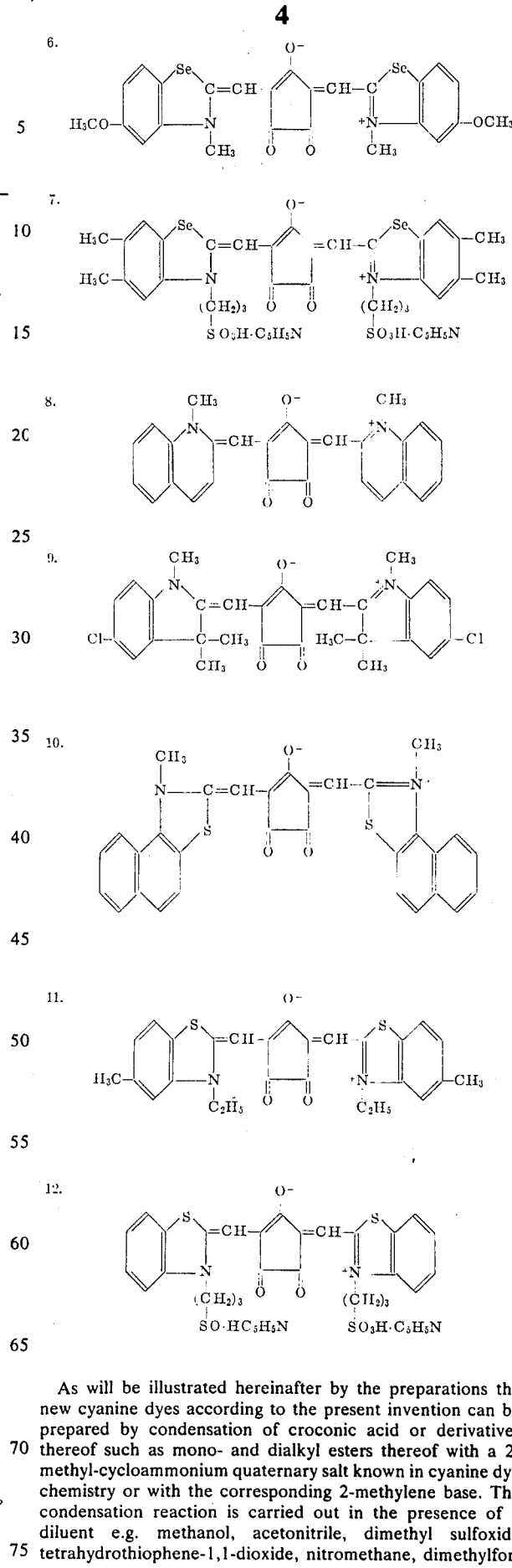

As will be illustrated hereinafter by the preparations the new cyanine dyes according to the present invention can be prepared by condensation of croconic acid or derivatives thereof such as mono- and dialkyl esters thereof with a 2-methyl-cycloammonium quaternary salt known in cyanine dye chemistry or with the corresponding 2-methylene base. The condensation reaction is carried out in the presence of a diluent e.g. methanol, acetonitrile, dimethyl sulfoxide tetrahydrothiophene-1,1-dioxide, nitromethane, dimethylformamide, etc. and/or in the presence of a basic condensing agent e.g. a trialkyl amine such as triethyl amine, a dialkyl aniline, a heterocyclic tertiary amine such as pyridine or N-alkylpiperidine or the like.

Preparation 1: dyestuff 4

To a solution of 2.85 g. of anhydro-2,5-dimethyl-3-(3-sulphopropyl)benzothiazolium hydroxide and 0.90 g. of croconic acid (prepared according to the method of Eistert et al. Ber. 93,1464) in 10 ml. of methanol, 7 ml. of pyridine are added. The solution is heated for about 20 min. on a warm water bath whereupon it is cooled and left standing for some time in the refrigerator. The bronze colored dye formed is filtered off and washed with cold methanol until the washings are no longer magenta colored. Finally the dye is washed with some ether and dried. Yield : 1.7 g. (41 percent).

The dye is sparingly soluble in methanol, but shows a good solubility in water and dimethyl sulfoxide. It exhibits a strong solvatochromism. As a matter of fact its absorption maximum lies at 680 nm. when measured in water and at 800 nm. when measured in dimethyl sulfoxide.

The dyes 2, 3, 5 and 7 of the above list can be prepared in a similar way as dye 4.

Preparation 2: dyestuff 1

1.20 g. of 2-methyl-3-ethyl-benzothiazolium iodide and 0.30 g. of croconic acid are taken up in 20 ml. of pyridine whereupon 0.6 ml. of triethylamine is added whereby the reactants dissolve. The solution is left standing overnight at room temperature whereupon the pyridine is partially removed by evaporation under reduced pressure and the residue is cooled in order to complete crystallization. The bronze-colored dye is washed twice with methanol and dried. Yield : 0.5 g. (54 percent).

Dye 6 of the above list of dyes can be prepared in a similar way.

Preparation 3: dyestuff 10

A solution is prepared of 5.20 g. of 2,3-dimethyl-naphtho[1,2d]thiazolium methyl sulfate and 1.12 g. of croconic acid in a mixture of 25 ml. of methanol and 25 ml. of pyridine. To this solution 4 ml. of triethylamine are added whereupon the solution is boiled for 10 min. on a warm water bath. The dye crystallized upon cooling, is filtered off and washed with methanol and ether. Yield : 0.5 g. (12 percent).

The dyes eight and 12 of the above list of dyes can be prepared in a similar way.

Preparation 4: dyestuff 9

1.35 g. of 1,2,3,3-tetramethyl-5-chloro-indoleninium iodide and 0.43 g. of croconic acid dimethyl acetal (prepared as described by Malachowski and Prebendowski in Ber. 71,2241) are dissolved in 12 ml. of pyridine. The mixture is left standing for several hours at room temperature and then heated for a few minutes on a boiling water bath. The dye is precipitated with ether and purified by washing with a little water and with ether. Yield : 0.08 g. (8 percent).

Preparation 5: dyestuff 11

To 3.17 g. of 2,5-dimethyl-3-ethylbenzothiazolium methyl sulfate in 7 ml. of methanol, 0.8 g. of croconic acid dissolved in a mixture of 5 ml. of pyridine, 3 ml. of methanol and 1 ml. of triethylamine is added. After having been kept three days at room temperature the dye is collected by suction and washed with ethanol until the washings are no longer magenta colored. Yield : 1.4 g. (29 percent).

The absorption characteristics of the dyes of the above formulae 1–10 are listed in the following table.

| Dyestuff | $\lambda_{max}$ (nm) | $\epsilon \cdot 10^{15}$ |
| --- | --- | --- |
| 1 | 755*** | 1.27 |
| 2 | 794 | 1.75 |
| 3 | 795 | 1.38 |
| 4 | 800 | 1.86 |
| 5 | 805 | 1.88 |
| 6 | 815** | 0.714 |
| 7 | 820 | 2.03 |
| 8 | 847 | 1.28 |
| 9 | 760*** | 0.365 |
| 10 | 820 | 1.09 |
| 11 | 795 | 1.61 |
| 12 | 793 | 1.98 |

*measured in dimethylsulphoxide unless otherwise stated

**measured in metacresol

***measured in methanol

The novel cyanine dyes according to the present invention are useful for spectrally sensitizing inorganic photoconductive compounds e.g. photoconductive zinc oxide dispersed in a binder.

A photoconductive zinc oxide layer when sensitized by means of a dye according to the present invention possesses a uniform sensitivity in the visible region of the spectrum and a high general sensitivity when exposed to an ordinary light bulb. Therefore, in accordance with the present invention it suffices to add one single sensitizer to the photoconductive zinc oxide composition in order to obtain the desired sensitivity where otherwise two or more spectral sensitizers are required to obtain the same effect.

Apart from having a favorable sensitizing action on photoconductive zinc oxide the dyes according to the present invention confer only a very low and neutral coloring to the photoconductive layer owing to the fact that the main absorption maximum of the dyes is situated beyond 700 nm., i.e. beyond the visible region of the spectrum. Thus, in accordance with the present invention there can be dispensed with the use of compensating dyes as described above.

The sensitizing dyes used in the present invention can be allowed to absorb to the inorganic photoconductive substance, preferably photoconductive zinc oxide, by adding them to a dispersion of that substance in an organic or aqueous medium either or not already containing the binder.

Zinc oxide recording layers applied from organic solvents and binding agents soluble in the organic medium are described e.g., in the Belgian Pat. Specification No. 612,102 and in the French Pat. Specification No. 1,560,975.

Zinc oxide recording layers applied from an aqueous medium are described in the United Kingdom Pat. Specifications Nos. 1,125,579 and 1,125,580.

The spectral sensitizing agents are preferably added in dissolved state, e.g. dissolved in a water-miscible solvent or in water, to a dispersion of the photoconductive zinc oxide. When applied in an aqueous zinc oxide dispersion they are preferably incorporated into the recording layer from an organic liquid consisting of or containing a solvent, which has a very low vapor pressure and which is at least for 20 percent by weight soluble in water at 20° C. Such a method for sensitizing a photoconductive material is described in the French Pat. Specification No. 1,517,558, which specification should be read in conjunction herewith.

Suitable dispersing agents for dispersing photoconductive zinc oxide in an aqueous medium are described in the French Pat. Specification 1,540,020, which specification should also be read in conjunction herewith.

The optimum quantity of sensitizing agent per gram of photoconductive zinc oxide can be determined easily by a series of tests. A useful range is comprised between 0.01 mg. and 2 mg. per gram of photoconductive zinc oxide. The weight ratio of zinc oxide to binder may vary between relatively large limits. A ratio of one part by weight of photoconductive substance to 0.1 to 0.6 part by weight of total content of binder is preferred. Advantageously the coating mixture contains dispersed photoconductive zinc oxide in a weight ratio of 95 percent to 60 percent in respect of the total solids content of the coated and dried layer. The thickness of the photoconductive layer may be chosen between wide limits according to the requirements of each case. Good recording and reproduction results are attained with electrophotographic layers having a thickness of 1 to 20 $\mu$, and preferably of 3 to 10 $\mu$.

Preferably the sensitizing substances are used in combination with photoconductive zinc oxide prepared according to the French process.

The photoconductive recording layers containing a spectral sensitizing agent as above described may contain, in addition to the photoconductive substance(s) and the binder, spectral sensitizers of any other type (see e.g. United Kingdom Pat. Specification No. 1,020,504), compounds increasing the dark resistivity, e.g. the phosphorous compounds described in the Belgian Pat. Specification No. 612,102, and additives known in coating techniques e.g. pigments (see e.g. United Kingdom Pat. Specification No. 1,007,349), compounds influencing the gloss and/or the viscosity, and compounds that counteract aging and/or oxidation of the layers, or which influence the thermal stability of the layers. When selecting any additives, preference is given to those which least reduce the dark resistivity of the photoconductive layer.

The photoconductive composition sensitized according to the present invention may be coated on a support according to a known coating technique, e.g. by spraying, whirling, dip coating, or by a coating technique wherein use is made of a doctor blade. The supports or base materials are chosen in view of the particular charging, exposure, recording, development and/or transfer technique wherein the recording material is used.

In electrophotographic recording techniques, wherein the photoconductive layer is electrostatically charged, the support preferably has an electric volume resistivity, which is considerably lower than that of the recording layer. Suitable supports are described e.g. in the United Kingdom Pat. Specifications Nos. 995,491, 1,020,503 and 1,020,504, and in the U.S. Pat. Specification No. 3,008,825.

The photoconductive layer of an electrophotographic material, which is prepared starting from a coating composition according to the present invention, can be used for recording purposes, in which prior to exposure an electric charge is nondifferentially applied according to known methods. However, the material can also be used in recording techniques, in which the exposure step precedes the charging step. For such a technique we may refer to e.g. the United Kingdom Pat. Specifications No. 1,033,419 and 1,033,420.

For comparison of the sensitivity of photoconductive recording elements, said elements are exposed in the same manner, e.g. through a step-wedge, and developed in the same conditions. Well established methods of developing electrostatic images include cascade-, powder cloud-, magnetic brush- and fur brush-development. These methods are based on the application of charged dry toner to the surface bearing the electrostatic image. Other methods are based on the use of liquids, either insulating (electrophoretic development) or conductive liquids (see e.g. the U.S. Pat. Specification No. 2,907,674 and the Belgian Pat. Specifications Nos. 610,060 and 625,335). Development of a conductivity image based on electrolysis is described e.g. by J.A. Amick, RCA Rev., 20, 753 (1959).

Apart from being useful spectral sensitizers for photoconductive zinc oxide the cyanine dyes according to the present invention also confer a high sensitivity for the 700–900 nm. region of the spectrum to silver halide photographic emulsions, especially the customarily employed gelatino silver chloride, gelatino silver chlorobromide, gelatino silver bromide, gelatino silver bromo-iodide and gelatino silver chlorobromo-iodide emulsions. Photographic silver halide emulsions containing water-permeable colloids other than gelatin, such as agar-agar, zein, collodion, water-soluble cellulose derivatives, poly(vinyl alcohol) or other hydrophilic synthetic or natural resins or polymeric compounds, can, however, also be sensitized with the methine dyes according to the present invention.

In order to prepare photographic emulsions sensitized according to this invention by one or more of the cyanine dyes, the cyanine dyes are incorporated in the photographic emulsion by one of the methods customarily employed in the art. In practice, it is convenient to add the dyes to the emulsion in the form of a solution in an appropriate solvent. The cyanine dyes can be added at any stage of the preparation of the emulsion and should be uniformly distributed throughout the emulsion. The concentration of the dyes in the emulsion may vary widely, for example from 0.1 to 30 mg. per mole of silver halide and will vary according to the effect desired. The suitable and most economical concentration for any particular emulsion will be apparent to those skilled in the art, upon making the ordinary tests and observations customarily used in the art of emulsion making.

The cyanine dyes can be incorporated into photographic emulsions the general sensitivity of which has been increased by physical and chemical ripening. As suitable chemical sensitizers may be mentioned the well-known sulfur sensitizers such as allyl isothiocyanate, allylthiourea, sodium thiosulphate, potassium selenocyanide, the natural sensitizers originating in the gelatin, the reducing sensitizers such as imino-amino-methane sulfinic acid and the derivatives thereof, cadmium salts, and the salts of noble metals such as gold, platinum and palladium.

In preparing the photographic emulsions according to the invention, the usual addenda such as antifogging agents, stabilizers, antibronzing agents, hardeners, wetting agents, plasticizers, development accelerators, color couplers, fluorescent brighteners and ultraviolet screening compounds can moreover be incorporated in the emulsion in the manner customarily employed in the art.

Emulsions sensitized with the methine dyes can be coated in the usual manner on a support such as glass, cellulose derivative film, resin film or paper.

The following examples are to illustrate the spectral sensitization results obtained with methine dyes according to the present invention.

Example 1

A series of photoconductive compositions were prepared as follows:

20 g. of photoconductive zinc oxide, 25 ccs. of water and 1 cc. of a 10 percent solution of copoly(maleic anhydride/N-vinyl pyrrolidone) (51.7/48.3) in a concentrated technical ammonia/water (one-ninth) solution were mixed for 10 minutes with a high speed stirrer such as Kothoff mixer. The dispersion was then added to a solution of 2 g. of poly(vinyl acetate/crotonic acid) (94.4/5.6) and 1.25 cc. of CASSURIT-MLP (partially etherified melamine-formaldehyde resin marketed as a 80 percent aqueous solution by Cassella Farbwerke Mainkur A.G., Frankfurt a/Main, W. Germany) in 25 ccs. of water and 1 cc. of a concentrated aqueous ammonia solution (25 percent by weight). The compositions obtained were each sensitized by means of one of the sensitizing agents mentioned in the following table. Each sensitizing dye was added in an amount of 0.5 mg. per gram of zinc oxide in the form of a 0.1 percent solution in dimethyl formamide and was intimately mixed with the ground composition.

The sensitized compositions were coated at a rate of 25 g. of zinc oxide per sq. m. on baryta coated paper supports weighing 90 g./sq. m.

After having been dried, the layers obtained were charged, exposed for 15 sec. with an irradiation intensity of 2280 lux by means of an incandescent lamp of 450 watt through a step wedge having a constant 0.1.

The differently sensitized layers were developed electrophoretically and the results are listed in the table below. The sensitivity of the recording layers obtained is expressed by the number of steps corresponding with the discharged areas on which no developing particles were deposited, which areas thus kept the original optical density of the recording layer. The higher this number, the more sensitive the layer.

TABLE

| Dyestuff | Number of nonblackened steps |
| --- | --- |
|  | 12 |
| 1 | 25 |
| 2 | 23 |
| 3 | 19 |
| 4 | 17 |
| 7 | 17 |

Example 2

The following two types of emulsions A and B were spectrally sensitized by means of the dyestuffs listed in the table below:

Emulsion type A: An acid gelatino silver halide emulsion, digested in the presence of a gold compound containing 72.5 mole percent of silver bromide, 27 mole percent of silver chloride and 0.5 mole percent of silver iodide and comprising per kg. 0.45 mole of silver halide.

Emulsion type B: An ammoniacal gelatino silver halide emulsion containing 97 mole percent of silver bromide and 3 mole percent of silver iodide and comprising per kg. 0.33 mole of silver halide.

To these emulsions were added per mole of silver halide 3 mg. of dyestuff from a solution or dispersion as indicated in the table.

After a digestion time of 2 hours at 38° C the emulsions were coated on a common support and dried.

The emulsion layers were exposed in a sensitometer through a step wedge with constant 0.15, once without filter(total speed) and once through a filter (IR speed), the transmission of which for light of a wavelength shorter than 732 nm. is less than 0.1 percent, for light of a wavelength longer than 800 nm. is more than 80 percent and for light of a wavelength longer than 820 nm. is more than 90 percent.

The relative sensitivities obtained are listed in the table below as the number of measurable steps of the wedge used.

The emulsions were also exposed in a spectrograph and the sensitizing maxima observed are also listed in the table below.

What we claim is:

1. A light sensitive element comprising a silver halide emulsion layer or an inorganic photoconductive layer spectrally sensitized with a cyanine dye having one of the following general formulae:

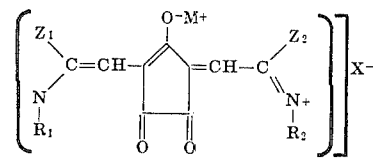

and

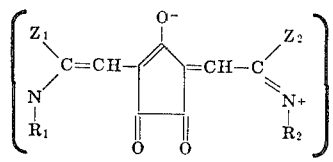

wherein: each of $R_1$ and $R_2$ (the same or different) stands for an alkyl group, an allyl group, an aralkyl group, an aryl group or a cycloalkyl group, each of $Z_1$ and $Z_2$ (the same or different) stands for the nonmetallic atoms necessary to complete a heterocyclic nucleus containing five or six atoms in the heterocyclic ring, $X^1$ stands for an anion but is not present when $R_1$ and/or $R_2$ contains an anionic group, and $M^+$ stands for a cation.

2. A light-sensitive element according to claim 1 wherein said element is a photographic silver halide material comprising a light-sensitive silver halide emulsion layer.

3. A light-sensitive element according to claim 2 wherein the said cyanine dye is present in the said silver halide emulsion layer in an amount comprised between 0.1 and 30 mg. per mole of silver halide.

4. A light-sensitive element according to claim 1 wherein said element is an electrophotographic recording material comprising an inorganic photoconductive substance.

| Test Number | Dyestuff | Solution or dispersion | Emulsion A | Emulsion B | Speed Total | Speed IR | Sens. max. (nm.) | Fog |
| --- | --- | --- | --- | --- | --- | --- | --- | --- |
| 0A | | | X | | 14.5 | | | 0.10 |
| 0B | | | | X | 16 | | | 0.15 |
| 1A | 1 | 100 mg. per litre methanol/metacresol (9/1) | X | | 15 | 13 | 805 | 0.07 |
| 1B | | | | X | 14.5 | 5.5 | 800 | 0.12 |
| 2A | 2 | 100 mg. per litre methanol/metacresol (8/2) | X | | 14 | 9 | 810 | 0.06 |
| 2B | | | | X | 15 | 2.5 | 810 | 0.10 |
| 3A | 3 | Dispersion* | X | | 14.5 | 7 | 810 | 0.09 |
| 3B | | | | X | 15.5 | 1 | 810 | 0.14 |
| 4A | 4 | 50 mg. per litre methanol/water (5/5) | X | | 14 | 10.5 | 805 | 0.08 |
| 4B | | | | X | 15.5 | 3.5 | 810 | 0.11 |
| 5A | 5 | 100 mg. per litre dimethylformamide | X | | 14.5 | 9 | 825 | 0.07 |
| | | | | X | 14.5 | 1 | 820 | 0.09 |
| 6A | 6 | 100 mg. per litre methanol/metacresol (1/9) | X | | 13.5 | 6.5 | 850 | 0.03 |
| 6B | | | | X | 14 | 3 | 815 | 0.11 |
| 7A | 7 | Dispersion* | X | | 14.5 | 11 | 830 | 0.07 |
| 7B | | | | X | 15 | 5.5 | 830 | 0.10 |
| 8A | 10 | do | X | | 14.5 | 8.5 | 830 | 0.08 |
| 8B | | | | X | 16 | 1.5 | 830 | 0.15 |

*The dispersion is made by mixing for 8 hours in a swinging mill 200 mg. of the dyestuff with 200 ml. of 2% aqueous gelatin in the presence of 100 mg. of sodium oleyl methyl taurine.

Example 3

An emulsion of type B of example 2 was spectrally sensitized by means of the dyestuffs listed in the table below and further treated as described in example 2.

The following results were attained.

5. A light-sensitive element according to claim 4 wherein said photoconductive substance is photoconductive zinc oxide.

6. A light-sensitive element according to claim 5 wherein the said dye is present in an amount comprised between 0.01 and 2 mg. per gram of zinc oxide.

| Dyestuff No. | Mg./mole AgX | Solution | Speed Total | Speed I.R. | Sens. max. nm. | Fog |
| --- | --- | --- | --- | --- | --- | --- |
|  |  |  | 15.5 |  |  | 0.14 |
| 11 | 3 | 100 mg. per litre methanol | 13 | 6 | 810 | 0.18 |

7. A light-sensitive element according to claim 5 wherein said element is prepared starting from a photoconductive composition containing water.

8. A light-sensitive element according to claim 5 containing a photoconductive layer comprising photoconductive zinc oxide dispersed in a binder which during the coating step was dissolved in an aqueous alkaline medium.